United States Patent

Kadota

Patent Number: 6,041,757
Date of Patent: Mar. 28, 2000

[54] INTER-CYLINDER-INJECTION FUEL CONTROLLER FOR AN INTERNAL COMBUSTION ENGINE

[75] Inventor: Yoichi Kadota, Tokyo, Japan

[73] Assignee: Mitsubishi Denki Kabushiki Kaisha, Tokyo, Japan

[21] Appl. No.: 09/014,652

[22] Filed: Jan. 28, 1998

[30] Foreign Application Priority Data

Oct. 27, 1997 [JP] Japan ................................. 9-294564

[51] Int. Cl.⁷ .................................................. F02M 51/00
[52] U.S. Cl. ......................... 123/478; 123/333; 123/295
[58] Field of Search ............................. 123/333, 339.23, 123/305, 295, 568.21, 479, 478; 701/104, 107

[56] References Cited

U.S. PATENT DOCUMENTS 4,977,876  12/1990  Nanyoshi et al. ...................... 123/333
5,048,482   9/1991  Kratt et al. ............................. 123/333
5,628,290   5/1997  Iida et al. .............................. 123/305

FOREIGN PATENT DOCUMENTS 62-186034  8/1987  Japan .

Primary Examiner—Thomas N. Moulis
Assistant Examiner—Mahmoud M. Gimie
Attorney, Agent, or Firm—Sughrue, Mion, Zinn, Macpeak & Seas, PLLC

[57] ABSTRACT

An inter-cylinder-injection fuel controller for an internal combustion engine which offers fail-safe performance against an increase in the amount of the intake air caused by a trouble in the intake system, and reliably suppresses the engine running speed from abnormally increasing. The fuel controller comprises various sensors 20 for outputting data representing operation conditions of the internal combustion engine, injectors for directly injecting the fuel into the cylinders, and a control unit 89 for operating the amounts F of fuel supplied into the cylinders based upon the operation conditions and for controlling the injectors based upon the amounts of supplying fuel, wherein said various sensors include an amount-of-intaken-air sensor for outputting data that corresponds to the amount Qa of the intaken air, and a crank angle sensor for outputting data θ that correspond to the running speed Ne and to the crank angle, and the control unit limits the width of the injection control signals J for the injectors to an upper-limit value that corresponds to the operation conditions.

6 Claims, 10 Drawing Sheets

INTER-CYLINDER-INJECTION FUEL CONTROLLER FOR AN INTERNAL COMBUSTION ENGINE

BACKGROUND OF THE INVENTION

1. Field of the Invention

The present invention relates to a fuel injection controller used for engines of ordinary automobiles, such as an inter-cylinder-injection fuel controller for an internal combustion engine, for controlling the torque produced by an engine by directly injecting the fuel into the cylinders. Particularly, the invention relates to an inter-cylinder-injection fuel controller for an internal combustion engine, which suppresses the engine torque (running speed) from abnormally increasing by clipping the amount of fuel injection (width of drive pulse for injectors).

2. Prior Art

In internal combustion engines used for automobiles, in general, the fuel injectors are installed in an intake manifold of an intake pipe, so that the fuel is supplied into the cylinders together with the intaken air.

FIG. 6 is a diagram illustrating the constitution of a conventional fuel controller for an internal combustion engine having injectors provided in the intake pipe.

In FIG. 6, an internal combustion engine 1 is constituted by a plurality of cylinders. Here, only one cylinder is shown for simplicity.

An intake pipe 1a and an exhaust pipe 1b are communicated with a combustion chamber of the engine 1, and a crank shaft 1c is coupled to an end of the engine 1.

The intake pipe 1a supplies the intaken air and fuel to the engine 1, and the exhaust pipe 1b exhausts exhaust gases after burned in the engine 1. The crank shaft 1c rotates being linked to the engine 1. The cooling water 1d surrounding the periphery of the engine 1 cools the engine 1.

An air flow sensor 2 provided in an inlet port of the intake pipe 1a measures the amount of the air intaken by the engine 1 as amount-of-intaken-air data Qa.

A throttle valve 3 provided in the intake pipe 1a is opened and closed being interlocked to an accelerator pedal (not shown) operated by a driver, to adjust the amount Qa of the air intaken by the engine 1.

A throttle opening sensor 4 provided for the throttle valve 3 detects a position of the throttle valve 3, i.e., detects a throttle opening degree θ.

A crank angle sensor 5 provided in relation to the crank shaft 1c outputs a pulse signal or a crank angle signal SGT in synchronism with the revolution of the crank shaft 1c. The crank angle signal SGT represents the running speed data of the engine 1 and the angular position data of the crank shaft 1c.

A water temperature sensor 6 for detecting the temperature Tw of the cooling water 1d works as a means for detecting the warmed-up state of the engine 1.

An oxygen sensor 7 provided in the exhaust pipe 1b detects the oxygen concentration Do in the exhaust gases exhausted from the engine 1 into the exhaust pipe 1b.

A control circuit 8 constituted by a microcomputer receives data (Qa, θ, SGT, Tw, Do, etc.) detected by various sensors mounted on various peripheral portions of the engine, outputs drive control signals to various actuators (spark plugs and injectors that will be described later) depending upon the operation conditions, and executes a variety of sequence drive control operations (ignition timing control operation and fuel injection control operation) for each of the cylinders of the engine 1. Thus, the engine 1 is driven by combustion at desired ignition timings and at a desired air-to-fuel ratio.

A spark plug 9 provided in the combustion chamber in the cylinder of the engine 1 is driven by a spark control signal P from the control circuit 8.

A by-pass passage BP is so provided for the intake pipe 1a as to by-pass the throttle valve 3.

An air by-pass valve 10 provided in the by-pass passage BP is driven by a by-pass control signal B from the control circuit 8, opens and closes the by-pass passage BP so as to adjust the amount of the air by-passing the throttle valve 3, thereby to control the torque while the vehicle is running and to control the running speed of the engine during the idling operation (when the throttle valve 3 is fully closed).

An injector 11 is mounted in the intake manifold at a position on the downstream side of the intake pipe 1a, and is driven by an injection control signal J from the control circuit 8 to supply fuel into the engine 1.

An EGR (exhaust gas reflux) pipe EP communicating the intake pipe 1a with the exhaust pipe 1b sends the exhaust gases exhausted from the engine back again to the combustion chamber so as to burn the exhaust gases again in order to decrease NOx.

An EGR valve 12 provided in the EGR pipe EP is driven by an EGR control signal E from the control circuit 8 to control the amount of the exhaust gases refluxed into the intake pipe 1a from the exhaust pipe 1b.

A cylinder identifying sensor 13 attached to the cam shaft of the engine 1 sends, to the control circuit 8, a cylinder identifying signal SGC for identifying the cylinder in which the combustion is taking place in synchronism with the operation of the intake valve of the engine 1.

Detection signals Qa, θ, SGT, Tw, Do and SGC obtained from the sensors 2, 4 to 7 and 13 are input to the control circuit 8. Actuators 9 to 12 are driven by control signals P, B, J and E output from the control circuit 8.

In a conventional device constituted as shown in FIG. 6, when an injection control signal J is output from the control circuit 8, the injector 11 is driven depending upon the drive pulse width of the injection control signal J, and the fuel of an amount corresponding to the injection control signal J is injected into the intake pipe 1a.

When the fuel is injected on the outside of the cylinder, however, the fuel partly adheres onto the inner walls of the intake pipe 1a and onto the intake valves of the engine before it is intaken into the cylinder of the engine 1. The fuel adheres particularly when the temperature is low (at the start of the operation) in which the fuel is less vaporized or during a transient operation condition where a response for the amount of fuel is required, resulting in the emission of exhaust gases containing harmful components in large amounts.

Therefore, there has heretofore been proposed an inter-cylinder-injection fuel controller for directly injecting fuel into the cylinders of the engine.

The inter-cylinder-injection fuel controller is drawing attention as an ideal engine, and offers the following effects (1) to (4) when it is used for a gasoline engine for general automobiles.

(1) Reducing the amount of toxic gases in the exhaust gases.

The fuel is directly injected near the spark plug 9 (see FIG. 6) in the combustion chamber. Therefore, the air-tofuel ratio can be decreased (lean burn) without the need of taking a delay in the transportation of fuel into consideration, making it possible to reduce the amounts of toxic HC gas and CO gas.

(2) Improving the fuel efficiency.

The fuel is injected depending upon the ignition timing just before the ignition. Therefore, an inflammable fuel is formed around the spark plug 9 at the time of ignition, and the distribution of the mixture gas containing fuel becomes nonuniform, making it possible to establish a stratified combustion. This makes it possible to greatly decrease the apparent air-to-fuel ratio (to make the air-to-fuel ratio lean) of the amount of the supplied fuel to the amount of the air intaken into the cylinder of the engine 1.

Owing to the stratified combustion, furthermore, the EGR (exhaust gas reflux) that is effected in large amounts does not so much adversely affect the combustion, making it possible to increase the amount Qa of the intaken air. Therefore, the pumping loss decreases and the fuel efficiency is improved.

(3) Increasing the output of the engine 1.

The mixture air concentrates around the ignition plug 9 and, hence, the end gas (mixture gas in a region remote from the spark plug 9) which causes knocking decreases. Owing to the stratified combustion, therefore, knocking occurs less, and the compression ratio of the engine 1 can be heightened.

Furthermore, the fuel vaporizes in the cylinder, and the vaporized fuel robs the air in the cylinder of the heat of vaporization. Therefore, the density of the intaken air increases, the volume efficiency increases, and the engine 1 produces an increased output.

(4) Improving the controllability.

Since the fuel is directly injected into the cylinder, the time delay is shortened from when the fuel is supplied until when the engine 1 produces an output by burning the fuel compared with the case of the device of FIG. 6. This makes it possible to realize an engine that quickly responds to the request of a driver.

In the inter-cylinder-injection fuel controller, there exist a lean operation mode in which the fuel is supplied in a very small amount during the compression stroke to establish a very lean stratified combustion to improve emission and fuel efficiency, and a stoichiometric operation mode in which the fuel is supplied in a required amount during the intake stroke to produce an increased output relying upon the combustion of an ordinary homogeneous mixture gas.

In the compression stroke injection (lean operation) mode, the operation is carried out on the lean side compared with the intake stroke injection (stoichiometric operation) mode. Therefore, the air Qa must be supplied in an increased amount to the engine 1 relative to a given throttle opening degree θ (accelerator opening degree). Therefore, the amount Qa of the intaken air that is usually controlled by the acceleration work only by the driver must be increased by another system.

FIG. 7 is a diagram illustrating the constitution of a conventional inter-cylinder-injection fuel controller of an internal combustion engine disclosed in, for example, Japanese Patent Laid-Open (Kokai) No. 186034/1987, and wherein the same constituent elements as those mentioned above are denoted by the same reference numerals but their description is not repeated.

The fuel controller shown here corrects the amount of fuel injection depending upon a change in the fuel pressure in order to suppress a fluctuation in the engine torque.

In FIG. 7, the control circuit 8A operates, for example, the amount of supplying fuel in relation to controlling the fuel and the injection timing, outputs an injection control signal J depending upon the operated result, drives the injector 11A during at least either the intake stroke or the compression stroke, thereby to inject the fuel. Here, a cylinder to be controlled is identified based on a cylinder identifying signal SGC, to control the injector 11A of each of the cylinders.

The injector 11A is not mounted in the intake pipe 1a but is directly mounted in the combustion chamber of a cylinder of the engine 1, and has been designed to operate at high speeds and under high pressures, in order to inject a high-pressure fuel within a short period of time during the intake stroke or the compression stroke.

An injector driver 14 inserted between the control circuit 8A and the injector 11A converts the injection control signal J from the control circuit 8A into an injection control signal K for high-speed and high-pressure operation to thereby drive the injector 11A.

In response to the injection control signal J from the control circuit 8A, the injector driver 14 outputs an injection control signal K of an amplified large electric power to inject the fuel with a pressure overcoming the pressure in the cylinder.

The air by-pass valve 10A works to control the torque during the lean operation inclusive of when the vehicle is running in addition to controlling the running speed of the engine during the idling condition in which the throttle valve 3 is fully closed, and has been so designed as to increase the range for controlling the amount of the intaken air through the by-pass passage.

Described below is the operation of the conventional inter-cylinder-injection fuel controller for an internal combustion engine shown in FIG. 7 with reference to a flow chart of FIG. 8, a timing chart of FIG. 9, and diagrams of FIGS. 10 to 13.

Referring to FIG. 9, a maximum amount Qmax of the intaken air which is an upper limit of the amount Qa of the intaken air is exclusively operated depending upon the operation conditions such as throttle opening degree θ, etc.

In this case, the air-to-fuel ratio A/F is controlled to become a target air-to-fuel ratio A/Fo, and the amount F of supplying the fuel increases depending upon an increase in the amount Qa of the intaken air.

When the amount Qa of the intaken air abnormally increases beyond the maximum amount Qmax of the intaken air and the engine running speed Ne exceeds a first maximum running speed Nmax1 (see a solid line), the fuel is cut and the amount F of supplying the fuel is set to 0.

When the engine running speed Ne decreases below a second maximum running speed Nmax2 (see a broken line) due to the cut of fuel, the amount F of supplying fuel is set again and the engine running speed Ne increases.

The second maximum running speed Nmax2 has been set to be lower by about 100 rpm than the first maximum running speed Nmax1.

Thus, hunting is suppressed by imparting a hysteresis between the first maximum running speed Nmax1 and the second maximum running speed Nmax2.

Accompanying an increase in the amount Qa of the intaken air, the engine running speed Ne increases starting from a time t1 together with the engine torque Te.

As the engine torque Te and the engine running speed Ne are suppressed due to the cut of fuel, the amount Qa of the intaken air is suppressed at a time t2 due to a decrease in the engine running speed Ne.

FIG. 10 is a diagram of a two-dimensional map for operating a target engine torque To, wherein the abscissa represents the engine running speed Ne and the ordinate represents the throttle opening degree θ.

In FIG. 10, a target engine torque To1 is exclusively calculated depending upon the detected engine running speed Ne1 and the throttle opening degree θ 1.

FIG. 11 is a diagram illustrating a relationship between the air-to-fuel ratio A/F and the engine torque Te, and shows characteristics curves of when the amount Qa of the intaken air is set to predetermined values Q1 to Q3.

In these characteristics curves, the engine torque Te becomes a maximum near (A/F=about 13) the stoichiometric air-to-fuel ratio (A/F=14.7) irrespective of the amount Qa of the intaken air. With the maximum amount Q3 of the intaken air, the engine torque T4 increases to a maximum.

Dot-dash chain lines are characteristics lines obtained by plotting the air-to-fuel ratios A/F1 to A/F3 and the engine torques T1 to T3 when the amount F of supplying fuel is fixed at a predetermined value on each of the characteristics curves.

When the amount F of supplying fuel is set to be constant as indicated by a dot-dash chain line, the engine torque Te slightly increases accompanying an increase in the amount of the intaken air from Q1 to Q3. However, a fluctuation in the engine torque Te is suppressed compared with the case of when the air-to-fuel ratio A/F is set to be constant.

Presumed here is a state where the amount of the intaken air is increased by-passing through the air by-pass valve 10A in the idling operation condition where the throttle valve θ is fully closed. Therefore, the characteristics curves of the amounts Q2 and Q3 of the intaken air of FIG. 11 are representing the cases where the amount Qa of the intaken air has increased due to abnormal condition in the intake system.

FIG. 12 is a diagram of a two-dimensional map for calculating a target air-to-fuel ratio A/Fo and a maximum amount Qmax of the intaken air, wherein the abscissa represents the engine running speed Ne and the ordinate represents the engine torque Te.

In FIG. 12, the target air-to-fuel ratio A/Fo and the maximum amount Qmax of the intaken air are exclusively calculated depending upon the detected engine running speed Ne1 and the engine torque Te1.

Representatively shown here is an operation map for operating the target air-to-fuel ratio A/Fo and the maximum amount Qmax of the intaken air in the stoichiometric operation mode. As required, however, there may be set an operation map in other operation mode such as a lean operation mode.

FIG. 13 is a diagram illustrating the characteristics of a maximum running speed Nmax set depending upon the throttle opening degree θ, wherein a solid line represents characteristics of a first maximum running speed Nmax1 and a broken line represents characteristics of a second maximum running speed Nmax2.

In FIG. 13, the first maximum running speed Nmax1 at a throttle opening degree θ i (nearly zero) close to the idling operation condition is set to be about 2500 rpm, and the first maximum running speed Nmax1 at a maximum throttle opening degree θ is set to be about 5000 to 6000 rpm.

In FIG. 8, first, the control circuit 8A receives various sensor signals, i.e., a throttle opening degree θ, an engine running speed Ne, an amount Qa of the intaken air, etc. (step S1), and calculates, as shown in FIG. 10, a target engine torque To from the throttle opening degree θ and the engine running speed Ne (step S2).

From the present operation condition, thereafter, it is determined whether the intake stroke injection (stoichiometric) mode or the compression stroke injection (lean) mode be selected (step S3), and it is determined whether the present operation condition is in the lean mode or not (step S4).

For example, when the operation condition is a steady-state running condition which is not a transient condition such as acceleration or deceleration, then, it is determined to be the one in which the lean operation can be carried out, i.e., determined to be a lean mode.

Depending upon the determined result at the step S4, furthermore, a target air-to-fuel ratio A/Fo and a maximum amount Qmax of the intaken air are operated from the engine running speed Ne and the engine torque Te by using an operation map (see FIG. 12) for stoichiometric or lean operation.

When the condition is determined to be the lean mode (i.e., YES), a target air-to-fuel ratio A/Fo and a maximum amount Qmax of the intaken air for the lean mode are calculated (step S5). When the condition is determined to be the stoichiometric mode (i.e., NO), a target air-to-fuel ratio A/Fo and a maximum amount Qmax of the intaken air for the stoichiometric mode are calculated (step S6).

Next, the amount F of supplying fuel is calculated from the amount Qa of the intaken air and the target air-to-fuel ratio A/Fo (step S7), and it is determined whether the amount Qa of the intaken air has exceeded a maximum amount Qmax of the intaken air (step S8).

When it is determined that Qa>Qmax (i.e., YES), it is determined whether the engine running speed Ne has exceeded a maximum running speed Nmax (i.e., YES) or not (step S9).

When it is determined that Ne>Nmax (i.e., YES), the fuel is cut (step S10) as shown in FIG. 9 in order to prevent the engine from becoming out of control.

Concerning the step S9, hysteresis for the maximum running speeds Nmax is not diagramed for the purpose of simplicity. As shown in FIGS. 9 and 13, however, a hysteresis exists between the first maximum running speed Nmax1 for determining YES and the second maximum running speed Nmax2 for determining NO.

On the other hand, when it is determined at the step S8 that Qa≦Qmax (i.e., NO) and at the step S9 that Ne≦Nmax (i.e., NO), then, the fuel is not cut at the step S10, and the processing routine of FIG. 8 ends.

By using the inter-cylinder-injection fuel controller as described above, the engine does not come into a stall (see FIG. 11) despite a very lean combustion state is established in which the air-to-fuel ratio A/F is not smaller than 30. Accordingly, the amount Qa of the intaken air can be controlled over an increased range, and the engine torque Te can be controlled over an increased range, too.

When the engine torque Te becomes excessive at the time when the amount Qa of the intaken air has abnormally increased, therefore, the engine running speed Ne must be suppressed from abnormally increasing.

In the case of the inter-cylinder-injection fuel controller, in particular, the amount of the intaken air through the by-pass passage is controlled over an increased range, and the effect of the EGR gas becomes serious due to the lean burn. Accordingly, the amount Qa of the intaken air tends to be abnormally increased due to abnormal condition in the by-pass intake system or in the EGR system, and an abnormal increase in the engine running speed Ne becomes no longer negligible.

As described above, therefore, the engine running speed Ne is suppressed from abnormally increasing by cutting the fuel with the maximum running speed Nmax as a reference.

However, the first maximum running speed Nmax1 has been set to be about 2500 rpm in the idling operation. When the amount Qa of the intaken air has abnormally increased due to abnormal condition in the intake system inclusive of the EGR, therefore, the engine running speed Ne abnormally increases up to 2500 rpm despite the fuel is cut.

In the device (see FIG. 6) which injects the fuel in the intake manifold, however, the engine tends to come into a stall when the amount Qa of the intaken air is increased. Therefore, the amount of the intaken air is not controlled to a large extent. In other words, the amount Qa of the intaken air does not become excessive, and the engine running speed Ne abnormally increases only to a negligible degree.

SUMMARY OF THE INVENTION

In the conventional inter-cylinder-injection fuel controller for the internal combustion engine as described above, the engine running speed Ne is suppressed from abnormally increasing by cutting the fuel based on the maximum amount Qmax of intaking the air and the maximum running speed Nmax, leaving, however, a problem in that it is not possible to sufficiently suppress an abnormal increase in the engine running speed Ne caused by an abnormal increase in the amount Qa of the intaken air particularly during the idling operation condition.

The present invention was accomplished in order to solve the above-mentioned problem, and its object is to provide an inter-cylinder-injection fuel controller for an internal combustion engine, in which an upper-limit value of the amount of supplying fuel is set depending upon the operation condition, and the amount of supplying fuel (drive width for the injector) is clipped depending upon the accelerator opening degree (required torque) by a driver, in order to offer fail-safe performance against an increase in the amount of the intaken air (increase in the engine torque) caused by a defective by-pass valve or the like, and to reliably suppress an abnormal increase in the engine running speed.

An inter-cylinder-injection fuel controller for an internal combustion engine according to the present invention comprises:

various sensors for outputting data representing operation conditions of the internal combustion engine;

injectors for directly injecting the fuel into the cylinders of the internal combustion engine; and a control unit for operating the amounts of fuel supplied into the cylinders based upon the operation conditions and for controlling the injectors based upon the amounts of supplying fuel; wherein said various sensors include an amount-of-intaken-air sensor for outputting data that corresponds to the amount of the air intaken by the internal combustion engine, and a crank angle sensor for outputting data that correspond to the running speed of the internal combustion engine and to the crank angle; and said control unit limits the width of the injection control signals for the injectors to an upper-limit value that corresponds to the operation conditions.

In the inter-cylinder-injection fuel controller for an internal combustion engine according to the present invention, furthermore, various sensors include a water temperature sensor for outputting data that represents the cooling water temperature of the internal combustion engine, and the control unit sets the upper-limit value to a low value when the cooling water temperature is high.

In the inter-cylinder-injection fuel controller for an internal combustion engine according to the present invention, furthermore, the control unit comprises:

an air-to-fuel ratio operation means for operating a practical air-to-fuel ratio based upon the amount of the intaken air and the amount of supplying fuel;

a target air-to-fuel ratio operation means for operating a target air-to-fuel ratio based upon the operation conditions; and an intake-system-defect determining means for determining the intake system of the internal combustion engine to be defective based upon an amount of deviation between the air-to-fuel ratio and the target air-to-fuel ratio when the pulse width for driving the injectors has been limited to the upper-limit value.

In the inter-cylinder-injection fuel controller for an internal combustion engine according to the present invention, furthermore, the intake-system-defect determining means determines the intake system to be defective when a condition in which the amount of deviation is larger than a predetermined value continues for more than a predetermined period of time.

In the inter-cylinder-injection fuel controller for an internal combustion engine according to the present invention, furthermore, the intake system includes:

a throttle valve provided in an intake pipe of the internal combustion engine to adjust the amount of the intaken air;

a by-pass passage provided for the intake pipe so as to by-pass the throttle valve; and an air by-pass valve for adjusting the amount of the intaken air flowing through the by-pass passage.

In the inter-cylinder-injection fuel controller for an internal combustion engine according to the present invention, furthermore, the intake system includes:

an EGR pipe for communicating the exhaust pipe of the internal combustion engine with the intake pipe thereof; and an EGR valve for adjusting the amount of EGR flowing through the EGR pipe.

DETAILED DESCRIPTION OF THE EMBODIMENTS

Embodiment 1.

An embodiment 1 of the present invention will now be described with reference to the drawings.

Figure 1:
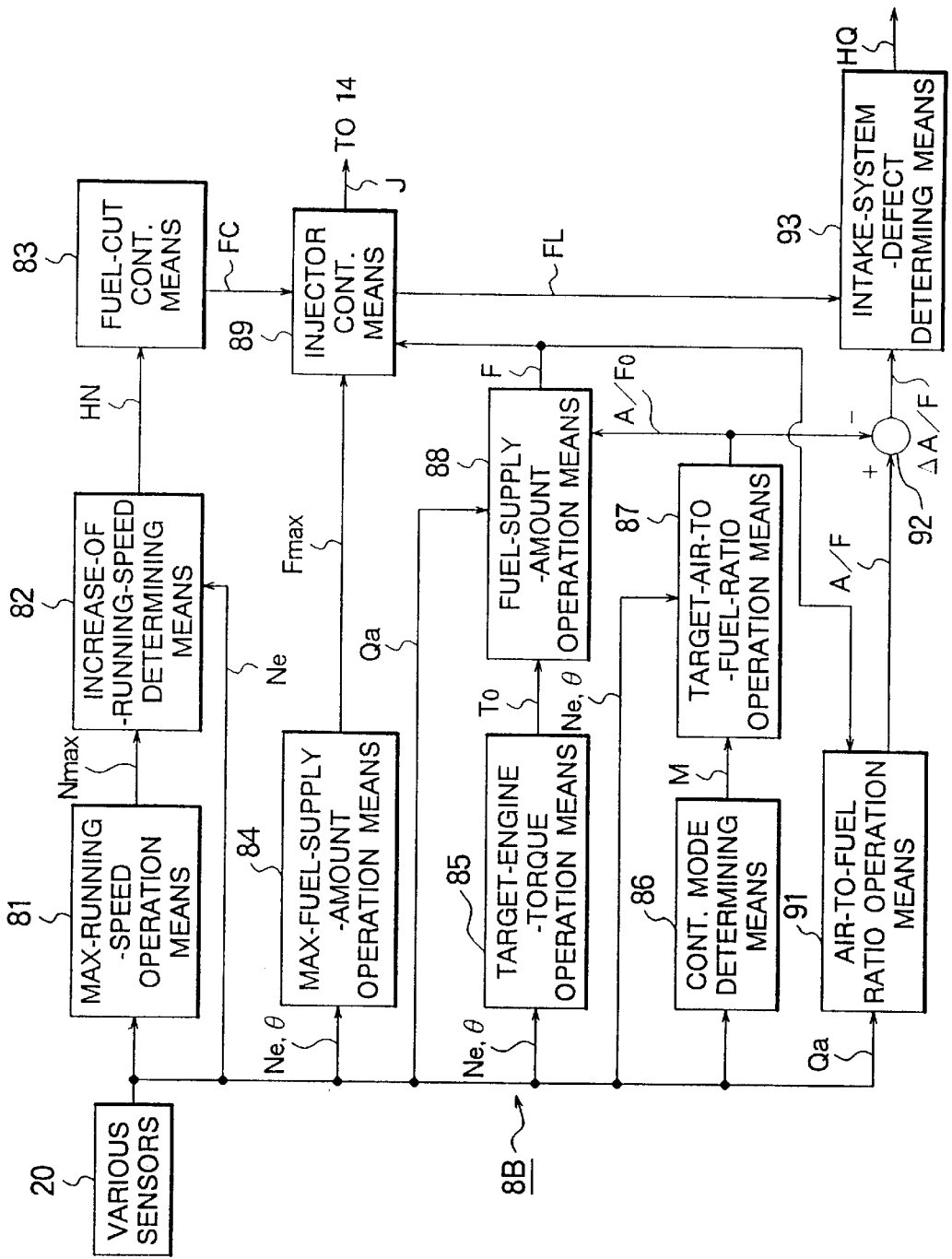
FIG. 1 is a functional block diagram illustrating a control circuit according to an embodiment 1 of the present invention.
Figure 7:
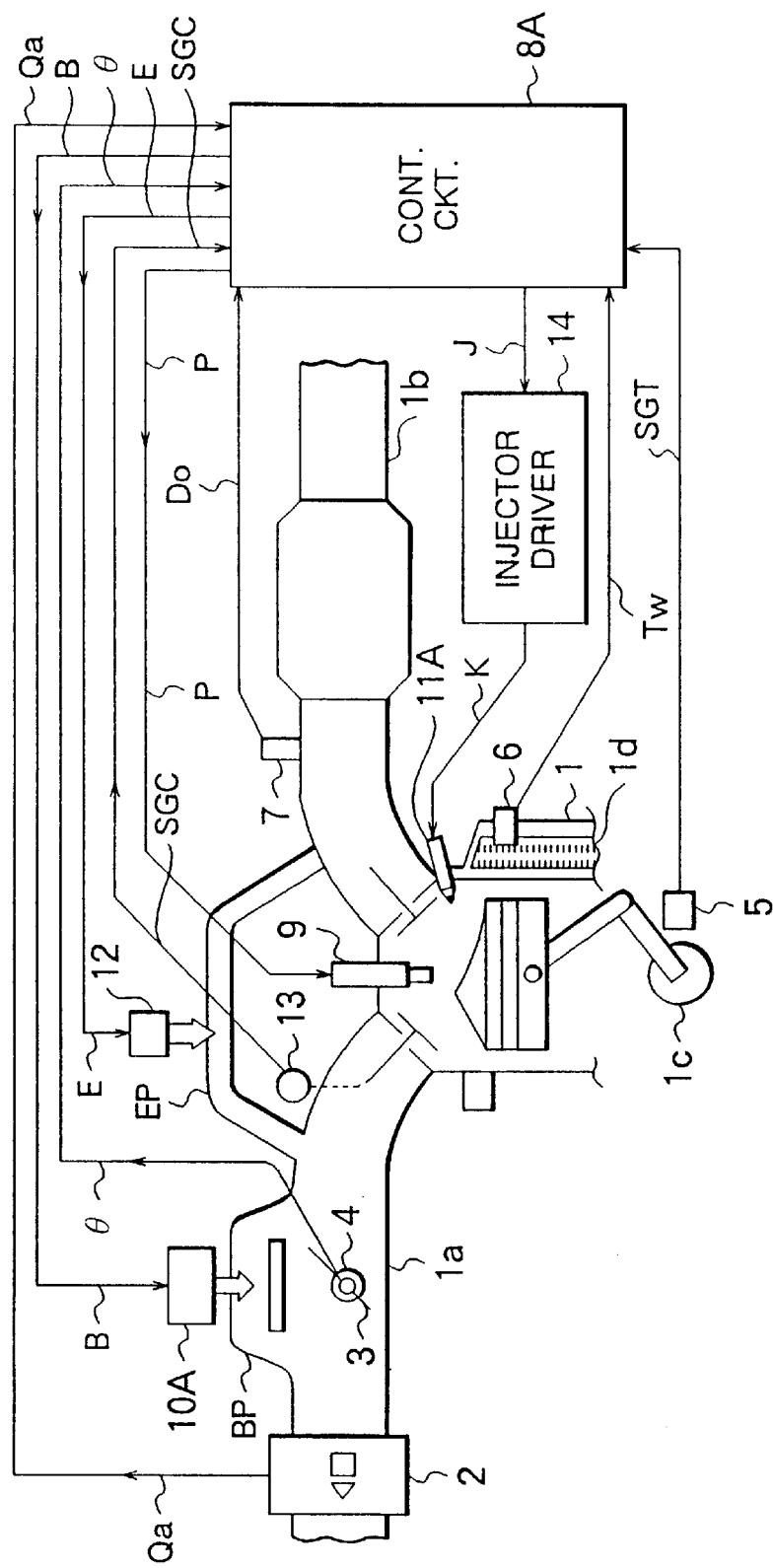
FIG. 7 is a diagram illustrating the constitution of a general inter-cylinder-injection fuel controller for an internal combustion engine.

FIG. 1 is a functional block diagram illustrating a control circuit 8B according to an embodiment 1 of the present invention, and wherein the constitution that is not shown complies with the one shown in FIG. 7.

Here, conveniently, each block is shown in a manner of being processed in parallel. In practice, however, it needs not be pointed out that each block is processed in a serial manner in synchronism with a crank angle signal SGT as shown in a flow chart (described later) of FIG. 2.

In FIG. 1, various sensors 20 include the above-mentioned (see FIG. 7) amount-of-intaken-air sensor 2, throttle opening degree sensor 4, crank angle sensor 5 and water temperature sensor 6, and sends a variety of detection signals, as data representing the operation conditions, to a control circuit 8B.

The control circuit 8B limits the drive width Tj (corresponds to the amount of supplying fuel) of an injection control signal J applied to an injector 11A via an injector driver 14 to an upper-limit value depending upon the operation conditions, and sets the upper-limit value to a low value when the cooling water temperature Tw is high.

The control circuit 8B includes a maximum-running-speed operation means 81 for operating a maximum running speed Nmax depending upon the operation conditions, an increase-of-running-speed determining means 82 for determining an abnormal increase in the engine running speed Ne, and a fuel-cut control means 83 for outputting a fuel-cut signal FC in response to a determination signal HN from the increase-of-running-speed determining means 82.

The control circuit 8B further includes a maximum-fuel-supply-amount operation means 84 for operating a maximum amount Fmax of supplying fuel depending upon the operation conditions, a target-engine-torque operation means 85 for operating a target engine torque To depending upon the operation conditions, a control mode determining means 86 for determining a control mode M based upon the operation conditions, and a target-air-to-fuel-ratio operation means 87 for operating a target air-to-fuel ratio A/Fo depending upon the operation conditions and upon the control mode M.

The control circuit 8B further includes a fuel-supply-amount operation means 88 for operating the amount F of supplying fuel based upon the target engine torque To and upon the target air-to-fuel ratio A/Fo, and an injector control means 89 for outputting an injection control signal J based upon the amount F of supplying fuel.

The injector control means 89 turns the injection control signal J off in response to the fuel-cut signal FC, and limits the drive width Tj of the injection control signal J in response to the maximum amount Fmax of supplying fuel.

The injector control means 89 has a fuel-cut function that works in response to the fuel-cut signal FC and a clipping function that works in response to the maximum amount Fmax of supplying fuel, and outputs a clip signal FL when the injection control signal J (drive width Tj for the injector 11A) has been limited to the upper-limit value.

The control circuit 8B further includes an air-to-fuel ratio operation means 91 for operating a practical air-to-fuel ratio A/F based upon the operation conditions (amount Qa of the intaken air) and the amount F of supplying fuel, a subtraction means for operating an amount of deviation $\Delta$ A/F between the air-to-fuel ratio A/F and the target air-to-fuel ratio A/Fo, and an intake-system-defect determining means 93 for determining a defect in the intake system based upon the amount of deviation $\Delta$ A/F and the clip signal FL.

The intake-system-defect determining means 93 outputs a defect determination signal HQ that indicates a defect in the intake system when a state in which the amount of deviation $\Delta$ A/F is larger than a predetermined value $\gamma$ continues for more than a predetermined period of time TH.

The control sequence operation according to the embodiment 1 of the invention will now be described with reference to FIGS. 1 to 4 and FIGS. 7, 10 and 11.

Figure 2:
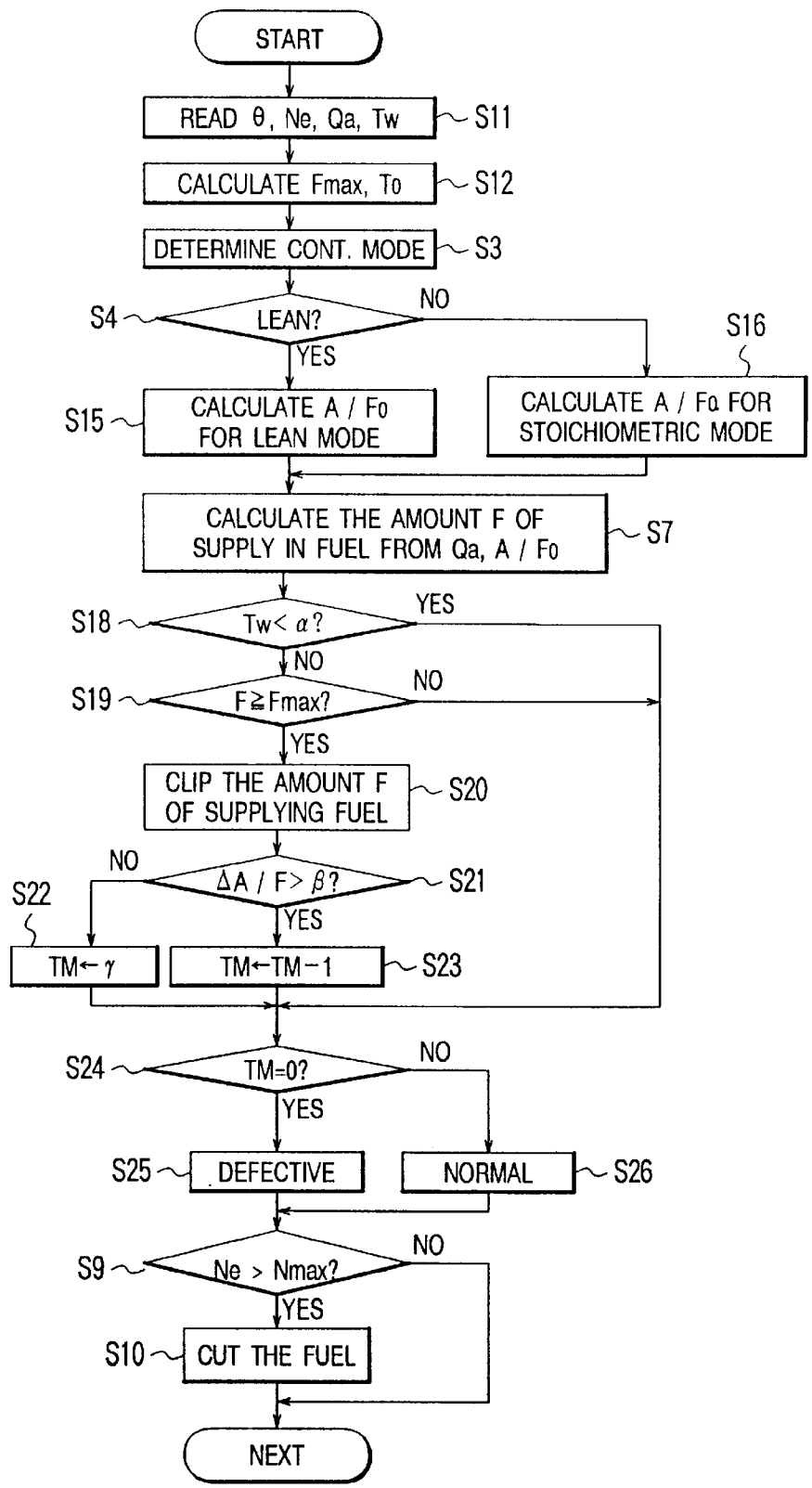
FIG. 2 is a flow chart illustrating a control sequence operation according to the embodiment 1 of the present invention.
Figure 3:
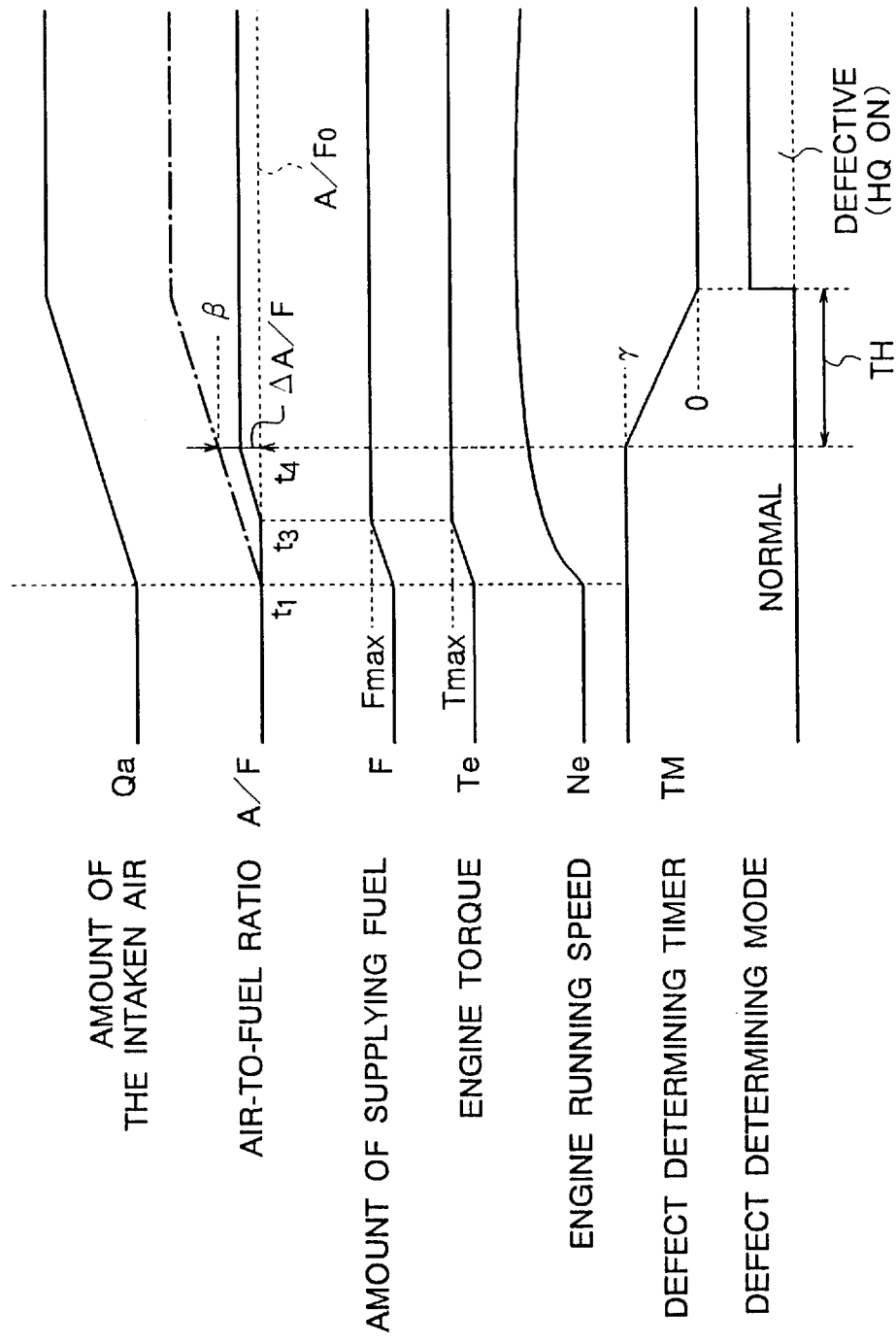
FIG. 3 is a timing chart for explaining the control sequence operation according to the embodiment 1 of the present invention.

FIG. 2 is a flow chart illustrating the control sequence operation according to the embodiment 1 of the present invention, and FIG. 3 is a timing chart illustrating the control sequence operation according to the embodiment 1 of the present invention.

Figure 8:
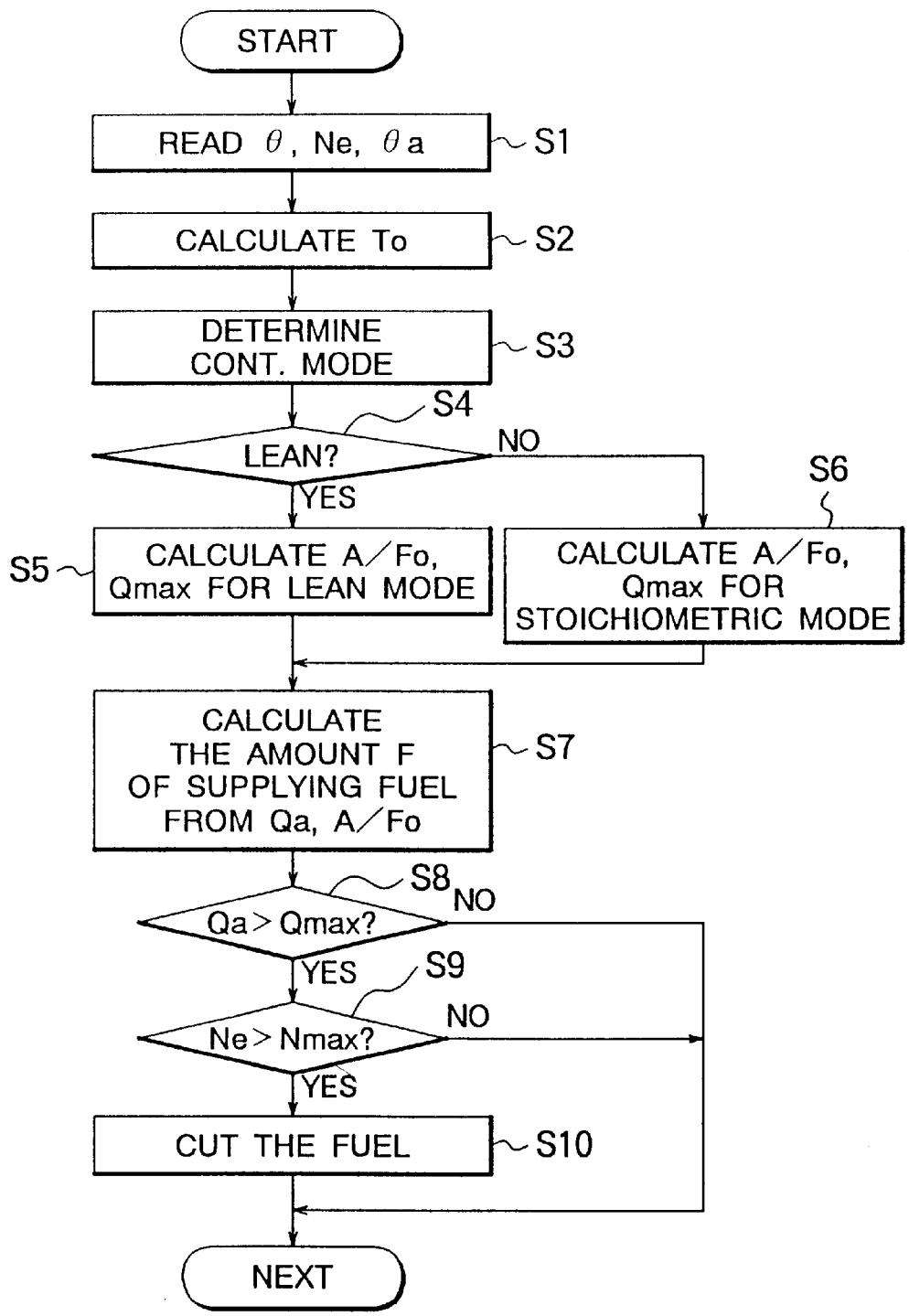
FIG. 8 is a flow chart illustrating a control sequence operation by a conventional inter-cylinder-injection fuel controller for an internal combustion engine.
Figure 9:
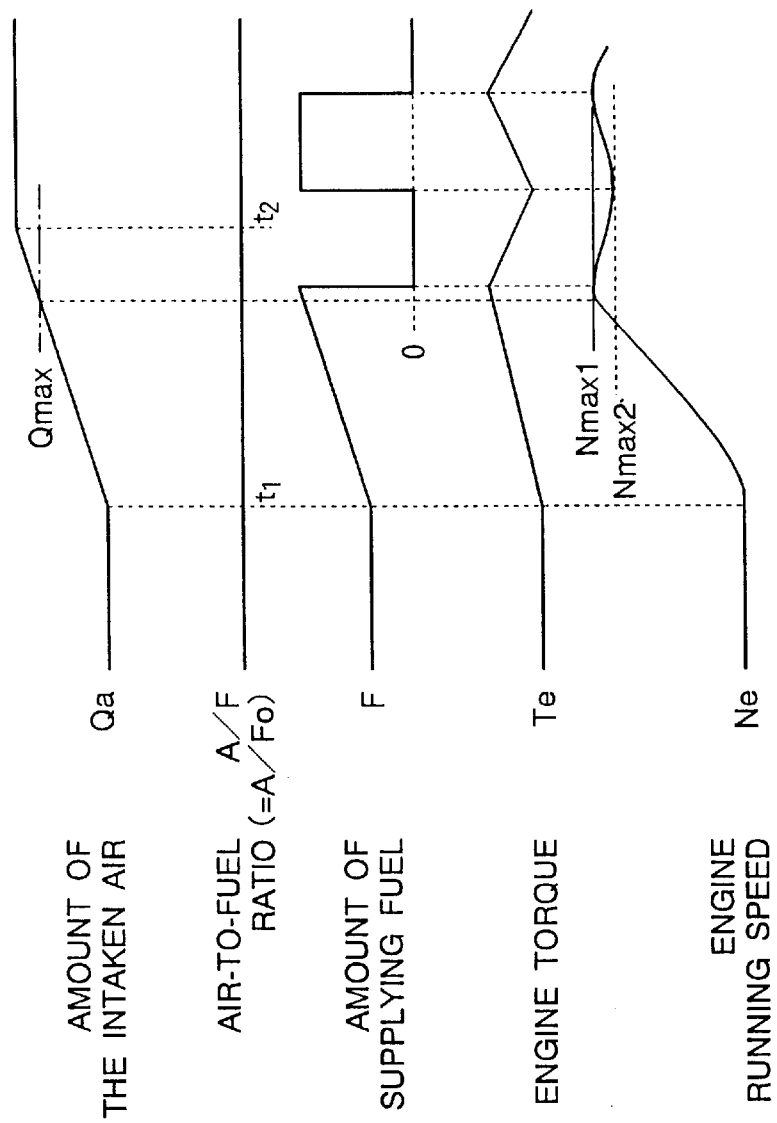
FIG. 9 is a timing chart for explaining the control sequence operation by the conventional inter-cylinder-injection fuel controller for the internal combustion engine.
Figure 10:
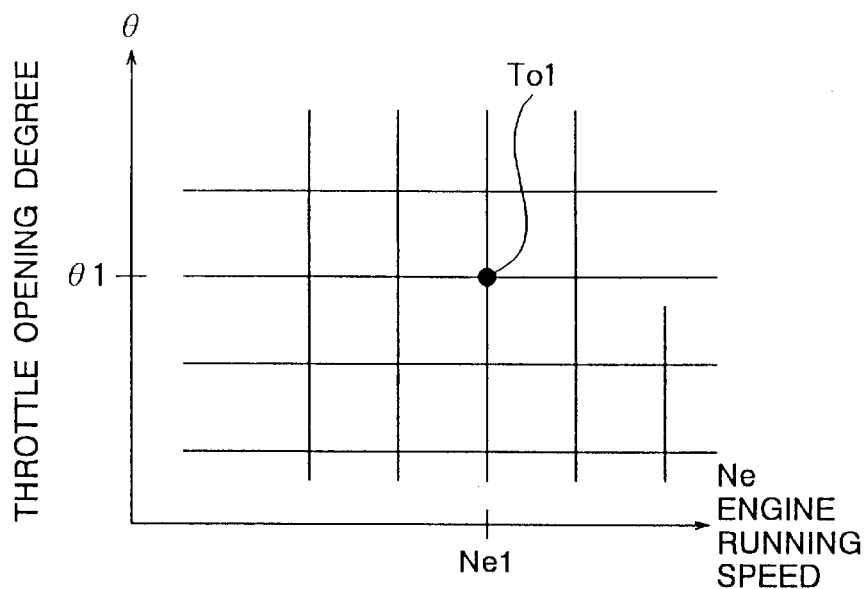
FIG. 10 is a diagram of a map for operating a target engine torque by the conventional inter-cylinder-injection fuel controller for the internal combustion engine.

In FIG. 2, the steps S3, S4, S7, S9 and S10 are the same as those described above (see FIG. 8), and are not described here in detail.

Figure 4:
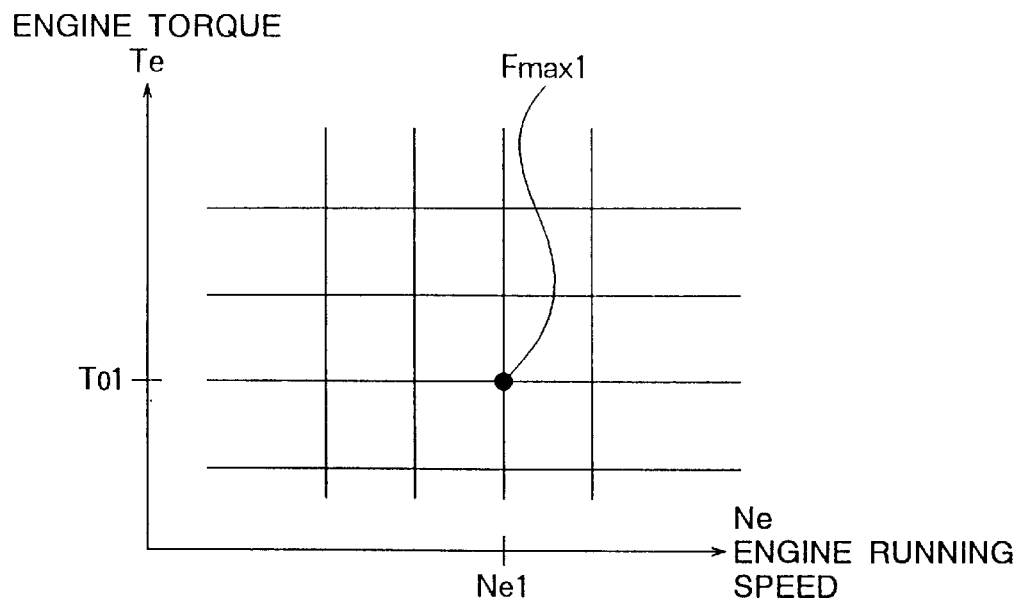
FIG. 4 is a diagram of a two-dimensional map for calculating a maximum amount of supplying fuel (upper-limit value) by a means for operating a maximum amount of supplying fuel in FIG. 1 (step S12 in FIG. 2)
Figure 5:
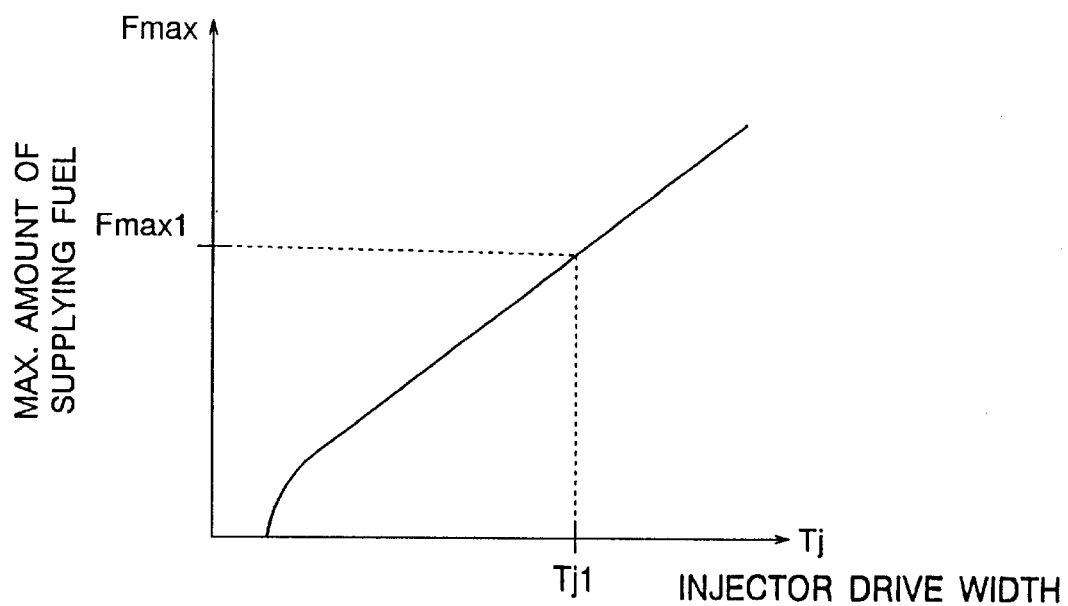
FIG. 5 is a diagram of characteristics illustrating the operation for calculating a width for driving the injector by the injector control means of FIG. 2.

FIG. 4 is a diagram of a two-dimensional map for operating a maximum amount Fmax of supplying fuel by the maximum-fuel-supply-amount operation means 82 of FIG. 1 (see step S12 in FIG. 2). FIG. 5 is a diagram of characteristics illustrating a maximum drive width Tj of the injection control signal J output from the injector control means 89 of FIG. 1, and shows an injector drive width Tj limited depending upon the maximum amount Fmax of supplying fuel.

Referring to FIG. 2, first, the control circuit 8B reads, as operation condition data, a throttle opening degree $\theta$, an engine running speed Ne, an amount Qa of the intaken air, a cooling water temperature Tw, etc. (step S11).

Then, the target-engine-torque operation means 85 in the control circuit 8B operates a target engine torque To by map operation (see FIG. 10), and the maximum-fuel-supply-amount operation means 84 operates, by map operation, a maximum amount Fmax of supplying fuel (upper-limit value for clipping) (step S12).

That is, concerning the target engine torque To, as described above, the accelerator opening degree by the driver is detected from the throttle opening degree $\theta$, and a target engine torque To1 depending upon the engine running speed Ne1 is calculated by regarding the detected throttle opening degree $\theta$ 1 as a torque to be produced by the engine 1.

Furthermore, the maximum amount Fmax of supplying fuel is calculated by map operation as shown in FIG. 4. That is, the maximum amount Fmax1 of supplying fuel is exclusively calculated from the detected engine running speed Ne1 and the target engine torque To1.

Concretely speaking, the maximum-fuel-supply-amount operation means 84 operates an amount F of supplying fuel necessary for achieving the target engine torque To, and calculates a maximum amount Fmax1 of supplying fuel from the engine running speed Ne1 (rotational speed) of FIG. 4 based upon the amount F of supplying fuel.

The engine running speed Ne tends to abnormally increase with an increase in the cooling water temperature Tw. Therefore, the maximum-fuel-supply-amount operation means 84 corrects the maximum amount Fmax of supplying fuel depending upon the cooling water temperature Tw, and sets the maximum amount Fmax of supplying fuel to be low in response to the cooling water temperature Tw.

Next, the control mode determining means 86 determines the control mode M depending upon the operation conditions (steps S3, S4), the target-air-to-fuel-ratio operation means 87 operates (step S15) a target air-to-fuel ratio A/Fo for the lean mode or operates (step S16) a target air-to-fuel ratio A/Fo for the stoichiometric mode depending upon the control mode M.

Furthermore, the fuel-supply-amount operation means 88 operates (step S7) the amount F of supplying fuel depending upon the amount Qa of the intaken air, target engine torque To and target air-to-fuel ratio A/Fo, and the injector control means 89 outputs an injection control signal J depending upon the amount F of supplying fuel.

FIG. 5 illustrates a relationship between the drive width Tj of the injection control signal J and the amount F of supplying fuel. The drive width Tj is exclusively determined depending upon the specifications of the injector 11A (see FIG. 7), and the injector control means 89 exclusively calculates the drive width Tj1 which is an upper-limit value for driving the injector and corresponds to the maximum amount Fmax1 of supplying fuel.

Accordingly, when the amount F of supplying fuel exceeds the maximum amount Fmax of supplying fuel, the injector control means 89 clips the drive width Tj of the injection control signal J to limit the amount F of supplying fuel to be not larger than the maximum amount Fmax of supplying fuel, in order to suppress an abnormal increase in the engine torque Te.

Figure 11:
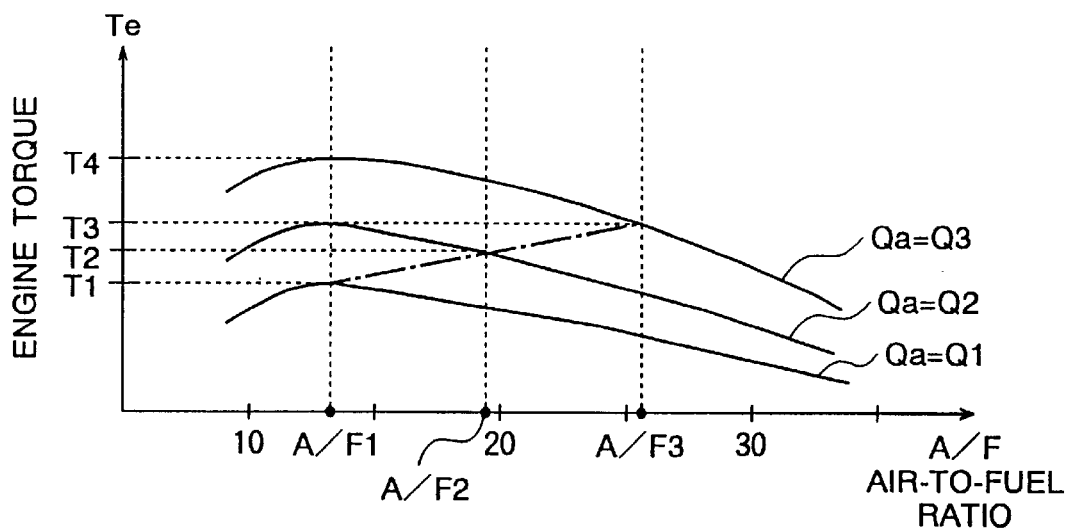
FIG. 11 is a diagram of characteristics illustrating a relationship between the air-to-fuel ratio and the engine torque by using a general inter-cylinder-injection fuel controller for the internal combustion engine.
Figure 12:
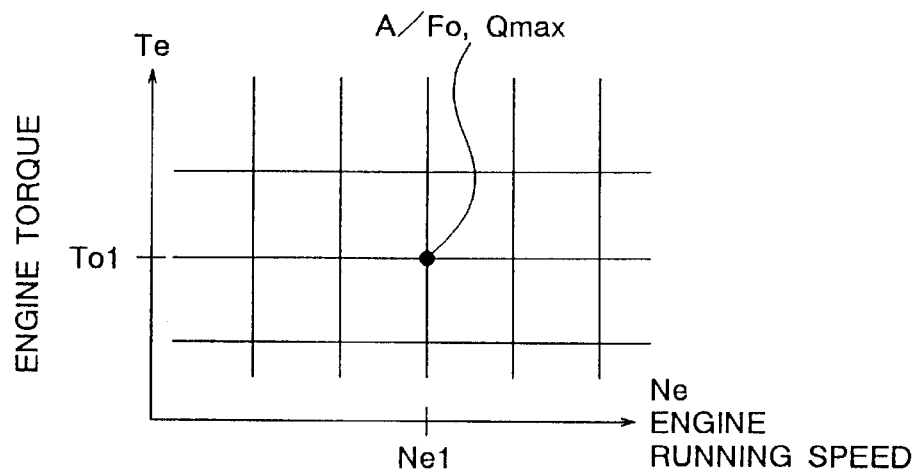
FIG. 12 is a diagram of a map for operating a target air-to-fuel ratio and a maximum amount of the intaken air by a conventional inter-cylinder-injection fuel controller for the internal combustion engine.
Figure 13:
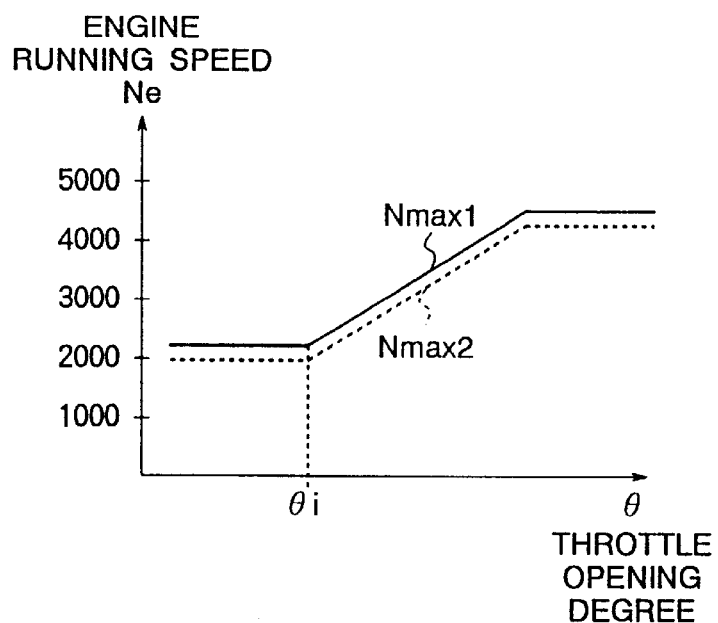
FIG. 13 is a diagram of characteristics illustrating a relationship between the throttle opening degree and the engine running speed by the conventional inter-cylinder-injection fuel controller for the internal combustion engine.

Described below with reference to FIG. 11 is the operation for suppressing the engine torque Te by clipping the amount F of supplying fuel.

In FIG. 11, a characteristics curve on which the engine torque Te remains on the smallest level exhibits the characteristics of when the air by-pass valve 10A is in a normal state. Other two characteristics curves exhibit characteristics of when the amount Qa of the air intaken by the engine has excessively increased due to defective air by-pass valve 10A.

Figure 6:
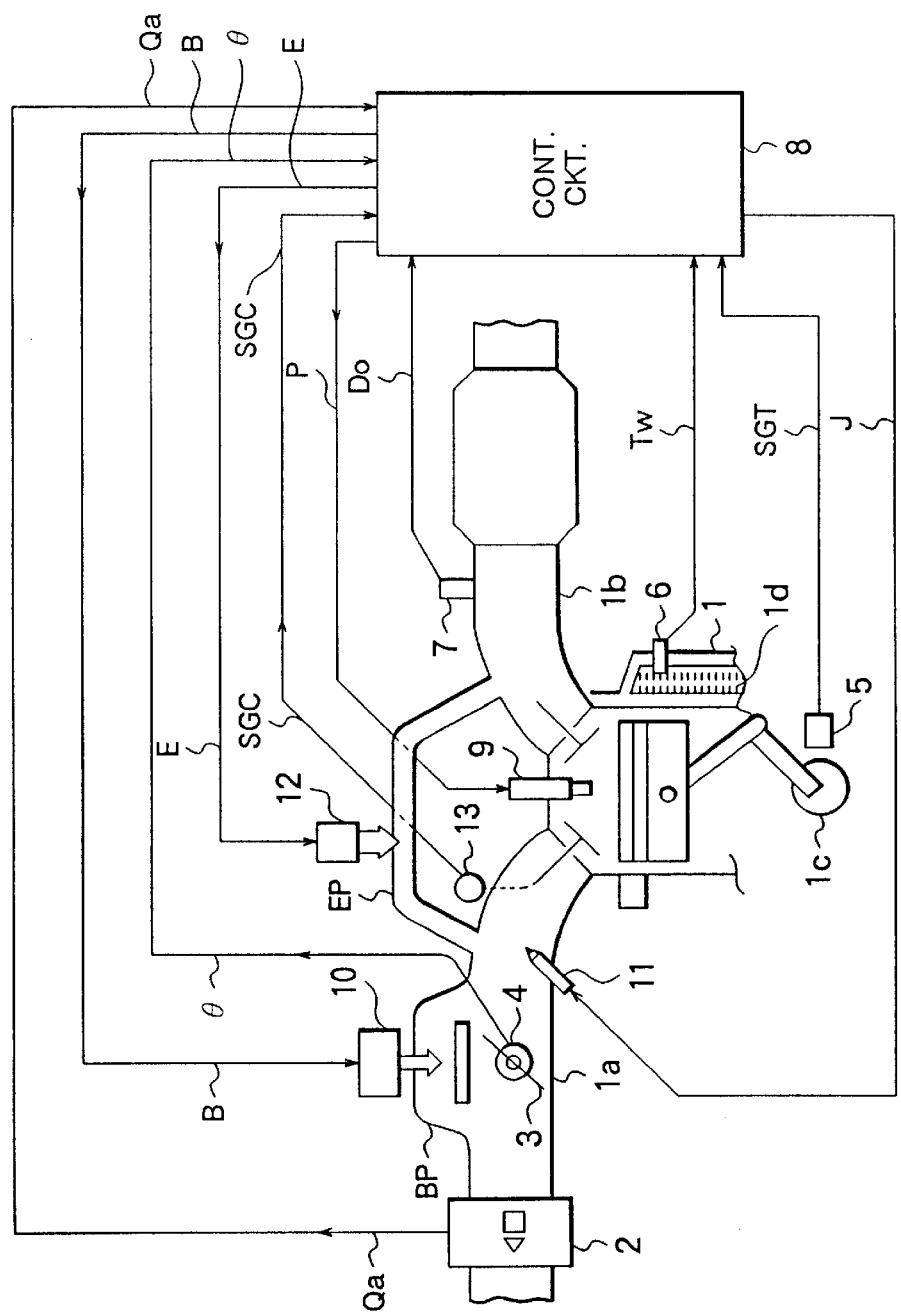
FIG. 6 is a diagram illustrating the constitution of a conventional fuel controller for an internal combustion engine based on a system for injecting fuel into the intake pipe.

As described above, the engine torque Te becomes a maximum near A/F=13 and decreases when A/F<13 (state where the fuel is supplied in excess amounts) and A/F>13 (state where the fuel is supplied in small amounts). In the conventional device of FIG. 6, the combustion takes place only within a range of air-to-fuel ratio of about A/F≦16. By using the inter-cylinder-injection device of FIG. 7, however, the engine can be operated even in a range of air-to-fuel ratio of A/F≧30 (though the output decreases).

For example, when the amount Qa of the intaken air has excessively increased from a normal value Q1 to an abnormal value Q3, the engine torque T1 under normal condition increases to an abnormal value T4 if the target air-to-fuel ratio A/Fo is controlled to remain constant.

By clipping the amount F of supplying fuel with a maximum amount Fmax of supplying fuel, however, the air-to-fuel ratio A/F successively shifts toward the lean side from a normal value A/F1, to A/F2 and to A/F3 as indicated by a dot-dash chain line.

Therefore, the engine torque Te (engine output) shifts from an engine torque T1 under normal condition to slightly increased engine torques T2, T3 accompanying a decrease in the pumping loss; i.e., the increment is suppressed to a sufficient degree.

The fuel supplied from the injector 11A to the engine 1 does not all burn, and the amount F of supplying fuel is not directly reflected by the engine torque Te. The state of combustion differs depending upon the operation conditions. When the cooling water temperature Tw is low, in particular, vaporization of the fuel is not promoted and it is desired to increase the amount F of supplying fuel.

Therefore, the maximum-fuel-supply-amount operation means 84 determines whether the cooling water temperature Tw is lower than a predetermined temperature α (step S18), and recognizes that the engine 1 is in a cold state when it is determined that Tw<α (i.e., YES), and the program proceeds to a step S24 that will be described later.

The result of determination at the step S18 is reflected at the next step S12, and the upper-limit value of the amount F of supplying fuel (drive width Tj for the injection 11A) or the maximum amount Fmax of supplying fuel is set to a large value.

Therefore, when the cooling water temperature Tw is lower than a predetermined temperature α, the amount F of supplying fuel is increased.

When it is determined at the step S18 that Tw≧α (i.e., NO), it is then determined whether the amount F of supplying fuel is greater than the maximum amount Fmax of supplying fuel or not (step S19).

When it is determined that F<Fmax (i.e., NO), the program proceeds to the step S24. When it is determined that F≧Fmax (i.e., YES), the amount F of supplying fuel is clipped to the maximum amount Fmax of supplying fuel (step S20).

As shown in FIG. 3, therefore, the air-to-fuel ratio A/F increases (shifts toward the lean side) from a time t3 at which the amount F of supplying fuel exceeds the maximum amount Fmax of supplying fuel, and the engine torque Te is clipped to the maximum engine torque Tmax.

That is, the pulse width (drive width Tj) of the injection control signal J is clipped depending upon the target air-to-fuel ratio A/Fo under a normal condition, and the air-to-fuel ratio A/F shifts from the air-to-fuel ratio A/F1 under a normal condition toward lean air-to-fuel ratios A/F2, A/F3 (see FIG. 11).

In this case, furthermore, the intake-system-defect determining means 93 detects an excess degree in the amount Qa of the intaken air depending upon the amount of deviation Δ A/F, and determines the defect in the by-pass intake system as described below.

First, the injector control means 89 outputs a clip signal FC while the amount F of supplying fuel is being clipped.

In response to the clip signal FC, the intake-system-defect determining means 93 compares the amount of deviation Δ A/F of the air-to-fuel ratio A/F input from the subtraction means 92 with a predetermined value β for determining defect, and determines whether the amount of deviation Δ A/F is larger than the predetermined value β or not (step S21).

When it is determined that Δ A/F≦β (i.e., NO), an initial value γ corresponding to a predetermined time TH is set to a defect determining timer TM constituted by a down counter (step S22), and the program proceeds to the step S24.

Referring to FIG. 3, on the other hand, it is presumed that the air-to-fuel ratio A/F abnormally increases (see a dot-dash chain line) from a time t1 accompanying an abnormal increase in the amount Qa of the intaken air, and the amount of deviation Δ A/F of the air-to-fuel ratio A/F increases beyond the predetermined value β at a time t4 while the amount F of supplying fuel is being clipped (time t3 and onwards).

At this moment, the practical air-to-fuel ratio A/F becomes larger than the target air-to-fuel ratio A/Fo, and it is determined at the step S21 that Δ A/F>β (i.e., YES). Therefore, a value of a defect determining timer TM is decreased (step S23), and the program proceeds to the step S24.

At the step S24, the intake-system-defect determining means 93 determines whether the value of the defect determining timer TM has decreased to zero or not.

When it is determined that TM=0 (i.e., YES) the state in which Δ A/F>β is continuing for only a predetermined period of time TH, and it is determined that the by-pass intake system and the EGR system (air by-pass valve 10A and EGR valve 12) are defective, and a defect determination signal HQ is turned on (step S25).

Thus, a defect determination signal HQ is formed to prevent erroneous determination due to noise, and is input to any external equipment (not shown) to indicate a highly reliable alarm or the like.

On the other hand, when it is determined at the step S24 that TM>0 (i.e., NO), the state in which Δ>β is not continuing for a predetermined period of time TH. Therefore, the by-pass intake system is determined to be normal, and the defect determining signal HQ is turned off (step S26).

Next, the increase-of-running-speed determining means 82 determines whether the engine running speed Ne is greater than the maximum running speed Nmax or not (step S9), and outputs a determination signal HN indicating an abnormal increase in the engine running speed Ne when it is determined that Ne>Nmax (i.e., YES).

In response to the determination signal HN, therefore, the fuel-cut control means 83 outputs a fuel-cut signal FC, and the injector control means 89 cuts the fuel in response to the fuel-cut signal FC (step S10).

Thus, the processing routine of FIG. 2 ends.

By employing the inter-cylinder-injection fuel controller as described above, a maximum amount Fmax of supplying fuel (injector drive width Tj) is calculated based upon the accelerator opening degree (throttle opening degree θ) by the driver and upon the engine running speed Ne, to limit the amount F of supplying fuel irrespective of the operation conditions of the engine 1.

That is, the engine torque Te is suppressed to prevent the engine running speed Ne from abnormally increasing despite the amount Qa of the air intaken by the engine 1 excessively increases due to a defect in the by-pass valve 10A, and the operation of the engine 1 is continued by realizing a fail-safe performance against an increase in the range for controlling the engine output, as a result of employing a simply constituted logic mechanism but without using any particular device.

I claim:

1. An inter-cylinder injection fuel controller for an internal combustion engine comprising:

various sensors for outputting data representing operation conditions of the internal combustion engine;

injectors for directly injecting the fuel into the cylinders of the internal combustion engine; and a control unit for operating the amounts of fuel supplied into the cylinders based upon the operation conditions and for controlling the injectors based upon the amounts of supplying fuel; wherein said various sensors include an amount-of-intaken-air sensor for outputting data that corresponds to the amount of the air intaken by the internal combustion engine, and a crank angle sensor for outputting data that correspond to the running speed of the internal combustion engine and to the crank angle; and said control unit limits widths of the injection control signals for the injectors to an upper-limit value that corresponds to the operation conditions by clipping said control signals to said upper-limit, in order to suppress abnormal increase in engine torque.

2. An inter-cylinder injection fuel controller for an internal combustion engine comprising;

various sensors for outputting data representing operation conditions of the internal combustion engine;

injectors for directly injecting the fuel into the cylinders of the internal combustion engine; and a control unit for operating the amounts of fuel supplied into the cylinders based upon the operation conditions and for controlling the injectors based upon the amounts of supplying fuel; wherein said various sensors include an amount-of-intaken-air sensor for outputting data that corresponds to the amount of the air intaken by the internal combustion engine, and a crank angle sensor for outputting data that correspond to the running speed of the internal combustion engine and to the crank angle;

said control unit limits widths of the injection control signals for the injectors to an upper-limit value that corresponds to the operation conditions; and said various sensors include a water temperature sensor for outputting data that represents the cooling water temperature of the internal combustion engine, and said control unit sets the upper-limit value to a low value when the cooling water temperature is high.

3. An inter-cylinder injection fuel controller for an internal combustion engine comprising:

various sensors for outputting data representing operation conditions of the internal combustion engine;

injectors for directly injecting the fuel into the cylinders of the internal combustion engine; and a control unit for operating the amounts of fuel supplied into the cylinders based upon the operation conditions and for controlling the injectors based upon the amounts of supplying fuel; wherein said various sensors include an amount-of-intaken-air sensor for outputting data that corresponds to the amount of the air intaken by the internal combustion engine, and a crank angle sensor for outputting data that correspond to the running speed of the internal combustion engine and to the crank angle; and said control unit limits widths of the injection control signals for the injectors to an upper-limit value that corresponds to the operation conditions; and wherein said control unit comprises:

an air-to-fuel ratio operation means for operating a practical air-to-fuel ratio based upon the amount of the intaken air and the amount of supplying fuel;

a target air-to-fuel ratio operation means for operating a target air-to-fuel ratio based upon the operation conditions; and an intake-system-defect determining means for determining the intake system of the internal combustion engine to be defective based upon an amount of deviation between the air-to-fuel ratio and the target air-to-fuel ratio when the pulse widths for driving the injectors has been limited to the upper-limit value.

4. An inter-cylinder-injection fuel controller for an internal combustion engine according to claim 3, wherein said intake-system-defect determining means determines the intake system to be defective when a condition in which the amount of deviation is larger than a predetermined value continues for more than a predetermined period of time.

5. An inter-cylinder-injection fuel controller for an internal combustion engine according to claim 3, wherein said intake system includes:

a throttle valve provided in an intake pipe of the internal combustion engine to adjust the amount of the intaken air;

a by-pass passage provided for the intake pipe so as to by-pass the throttle valve; and an air by-pass valve for adjusting the amount of the intaken air flowing through the by-pass passage.

6. An inter-cylinder-injection fuel controller for an internal combustion engine according to claim 3, wherein said intake system includes:

an EGR pipe for communicating the exhaust pipe of the internal combustion engine with the intake pipe thereof; and an EGR valve for adjusting the amount of EGR flowing through the EGR pipe.

* * * * *